United States Patent
Nakazawa et al.

(10) Patent No.: US 10,687,544 B2
(45) Date of Patent: Jun. 23, 2020

(54) FEED ADDITIVE COMPOSITION FOR RUMINANTS CONTAINING ACIDIC OR NEUTRAL AMINO ACID, AND METHOD FOR PRODUCTION THEREOF

(71) Applicant: AJINOMOTO CO., INC., Chuo-ku (JP)

(72) Inventors: Hidetsugu Nakazawa, Kanagawa (JP); Hiroyuki Sato, Kanagawa (JP); Yuki Miyazawa, Kanagawa (JP); Susumu Shibahara, Kanagawa (JP); Sachiko Oka, Kanagawa (JP); Yumi Goto, Kanagawa (JP)

(73) Assignee: AJINOMOTO CO., INC., Chuo-ku (JP)

( * ) Notice: Subject to any disclaimer, the term of this patent is extended or adjusted under 35 U.S.C. 154(b) by 0 days.

(21) Appl. No.: 14/075,099

(22) Filed: Nov. 8, 2013

(65) Prior Publication Data
US 2014/0065260 A1    Mar. 6, 2014

Related U.S. Application Data

(63) Continuation of application No. 12/896,305, filed on Oct. 1, 2010, now abandoned, which is a
(Continued)

(30) Foreign Application Priority Data

Apr. 3, 2008 (JP) .................................. 2008-097408

(51) Int. Cl.
*A23K 40/35* (2016.01)
*A23K 50/10* (2016.01)
(Continued)

(52) U.S. Cl.
CPC ............ *A23K 40/35* (2016.05); *A23K 20/142* (2016.05); *A23K 20/158* (2016.05); *A23K 50/10* (2016.05)

(58) Field of Classification Search
CPC ...... A23K 40/35; A23K 50/10; A23K 20/158; A23K 1/1634; A23K 20/142
See application file for complete search history.

(56) References Cited

U.S. PATENT DOCUMENTS 3,804,776 A * 4/1974 Yazawa et al. ....... A23L 1/0032
424/450
4,713,245 A * 12/1987 Ando ..................... A23K 1/001
424/438
(Continued)

FOREIGN PATENT DOCUMENTS

EP    0495441 A2    7/1992
EP    0 610 957    8/1994
(Continued)

OTHER PUBLICATIONS

Chockshi et al., "Hot-Melt Extrusion Technique—A Review" Iranian Journal of Pharmaceutical Reserach (2004) 3:3-16.*
(Continued)

*Primary Examiner* — Erik Kashnikow
*Assistant Examiner* — Assaf Zilbering
(74) *Attorney, Agent, or Firm* — Oblon, McClelland, Maier & Neustadt, L.L.P.

(57) ABSTRACT

A feed additive composition includes a protective agent, lecithin, an acidic or neutral amino acid, and water. A method of producing a feed additive composition includes preparing a molten mixture of a protective agent, lecithin, and an acidic or neutral amino acid, and immersing the molten mixture in water or an aqueous liquid to obtain a solidified mixture. Feed additives may be obtained by such method. The protective agent may include a hydrogenated
(Continued)

vegetable oil or hydrogenated animal oil having a melting point of higher than 50° C. and lower than 90° C.

8 Claims, 1 Drawing Sheet

Related U.S. Application Data continuation-in-part of application No. PCT/JP2009/057236, filed on Apr. 2, 2009.

(51) Int. Cl.
*A23K 20/158* (2016.01)
*A23K 20/142* (2016.01)

(56) References Cited

U.S. PATENT DOCUMENTS

| | | | |
|---|---|---|---|
| 5,227,166 | A | 7/1993 | Ueda et al. |
| 5,300,297 | A | 4/1994 | Ueda et al. |
| 5,402,992 | A * | 4/1995 | Saxena ............ B22F 9/08 164/437 |
| 5,429,832 | A | 7/1995 | Ueda et al. |
| 5,744,178 | A | 4/1998 | Ikeda et al. |
| 5,753,223 | A | 5/1998 | Shibahara et al. |
| 6,238,727 | B1 | 5/2001 | Takemoto et al. |
| 6,797,291 | B2 | 9/2004 | Richardson |
| 7,939,117 | B2 | 5/2011 | Zuccarello et al. |
| 2003/0129295 | A1 | 7/2003 | Richardson et al. |
| 2007/0148212 | A1* | 6/2007 | Okutani ............ A23K 1/005 424/442 |
| 2009/0092704 | A1 | 4/2009 | Gately et al. |
| 2009/0232933 | A1 | 9/2009 | Nakazawa et al. |
| 2010/0272852 | A1 | 10/2010 | Wright et al. |
| 2011/0081444 | A1 | 4/2011 | Nakazawa et al. |
| 2011/0095206 | A1 | 4/2011 | Noto |
| 2011/0250286 | A1 | 10/2011 | Marcello et al. |
| 2013/0095206 | A1 | 4/2013 | Nakazawa et al. |

FOREIGN PATENT DOCUMENTS

| | | |
|---|---|---|
| EP | 0940088 A2 | 9/1999 |
| EP | 1405570 A1 | 4/2004 |
| EP | 1741347 A1 | 1/2007 |
| JP | S61-28351 | 2/1986 |
| JP | H9-172979 | 7/1997 |
| JP | 10-42795 | 2/1998 |
| JP | H10-42795 | 2/1998 |
| JP | 2000-60440 | 2/2000 |
| JP | 2000-271916 | 10/2000 |
| JP | 2005-515223 | 5/2005 |
| JP | 2005-312380 | 11/2005 |
| JP | 2005/312380 A | 11/2005 |
| JP | 2006-137199 | 6/2006 |

OTHER PUBLICATIONS

"Lecithin Emulsifying". Available online at www.adm.com on May 10, 2005.*
"Partially Hydrogenated Vegetable Oils". Available online at www.mysite.du.edu on Feb. 1, 2002.*
Office Action dated Oct. 24, 2014, in co-pending U.S. Appl. No. 12/696,208.
"Lecithin Emulsifying" Available online at www.adm.com on May 10, 2005, 5 pages.
"ADM Feed Ingredients Catalog". Available online at www.admworld.com on Mar. 2008.
U.S. Appl. No. 12/896,264, filed Oct. 1, 2010, US2011/0081444 A1, Nakazawa, et al.
U.S. Appl. No. 12/696,208, filed Jan. 29, 2010, Shibahara, et al.
U.S. Appl. No. 13/709,194, filed Dec. 10, 2012, US2013/0095206 A1, Nakazawa, et al.
U.S. Appl. No. 14/316,827, filed Jun. 27, 2014, Nakazawa, et al.
U.S. Appl. No. 14/316,828, filed Jun. 27, 2014, Nakazawa, et al.
Chokshi, et al., Hot-Melt Extrusion Technique: A Review. Iranian Journal of Pharmaceutical Research (2004) 3:3-16.
Water Activity in Food,drinc.ucdavis.edu/dairychem4_new.htm, Feb. 2001.
International Search Report dated May 26, 2009 in International Application No. PCT/JP2009/057236 filed Apr. 2, 2009.
International Search Report dated Jul. 12, 2011, Application No. PCT/JP2009/728240A filed Apr. 2, 2009.

* cited by examiner

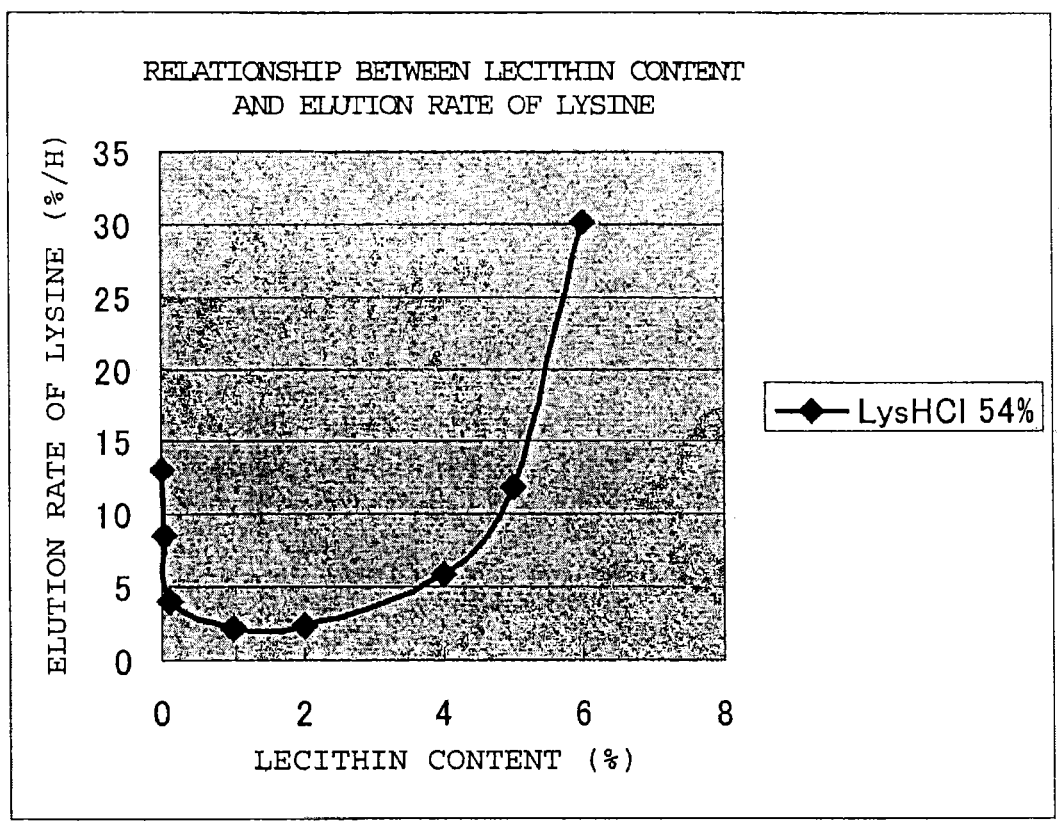

since this rumen

FEED ADDITIVE COMPOSITION FOR RUMINANTS CONTAINING ACIDIC OR NEUTRAL AMINO ACID, AND METHOD FOR PRODUCTION THEREOF

CROSS REFERENCES TO RELATED APPLICATIONS

This application is a continuation application of U.S. Ser. No. 12/896,305, filed Oct. 1, 2010; which is a continuation-in-part of International Patent Application No. PCT/JP2009/057236, filed on Apr. 2, 2009, and claims priority to Japanese Patent Application No. 2008-097408, filed on Apr. 3, 2008, the disclosures of which are incorporated herein by reference in their entireties.

BACKGROUND OF THE INVENTION

Field of the Invention

The present invention relates to a feed additive composition for ruminants, for example, a feed additive composition for ruminants that is capable of bypassing through a rumen in lactating cows, and a method of producing the same.

Discussion of the Background

When ruminants ingest feed, a portion of the nutrients in the feed is exploited as a nutrient source for microorganisms living in the first stomach (i.e., rumen). Therefore, feed additive preparations for ruminants have been employed in which nutrients in the preparations are protected with protective agents that are not degradable by microorganisms in the rumen. As a result, the nutrients are not exploited by microorganisms when they pass through the rumen.

The main nutrients used to supplement feed for ruminants are amino acids. In general, amino acids that are important in feed are basic amino acids. Feed additive compositions for ruminants including basic amino acids are known. However, workable feed additive compositions for ruminants employing acidic or neutral amino acids are not known.

Feed additive preparations for ruminants in which nutrients are protected with protective agents, may be prepared by a dispersion-type technique in which the nutrients and protective agents are kneaded together. However, in dispersion-type preparations, amino acids are partially exposed at the preparation surface, and thus when the amino acids are in contact with the rumen juice at a pH of from 6 to 8, the amino acids tend to be eluted. Therefore, dispersion-type preparations do not effectively prevent the loss of amino acids in the rumen. A variety of protective agents are employed to reduce the loss of amino acids from preparations. As a result, a problem that arises is that the content of amino acids in the preparations decreases. Thus, in general, it is difficult to produce dispersion-type preparations containing amino acids in amounts exceeding 40% by weight. To prevent the loss of amino acids in dispersion-type preparations, there have been developed coated-type preparations formed by using the dispersion-type preparation as a core, and further coating the core with a coating agent to encapsulate the dispersion-type preparation. In such preparations, because there is no chance for the amino acids to be exposed at the preparation surface due to the coating, the amino acids are relatively stable in the rumen juice. However, such preparations have drawbacks in terms of production, because the production process is complicated compared to the production process of dispersion-type preparations. Accordingly, new processes are needed.

JP-B-49-45224 describes the production of dispersion-type granules having a size of several millimeters or less, using a mixture of oils and fats having a melting point of 40° C. or higher and oils and fats having a melting point of 40° C. or lower as a protective agent, by dispersing amino acids or peptides in the mixture, and injecting the mixture into water having a temperature of 20° C. to 40° C. through nozzles having a diameter of 0.8 to several millimeters. JP-B-49-45224 also describes the production of granules containing 30 to 40% of L-methionine or L-isoleucine as the amino acid, which both have low solubility in water.

JP-A-2005-312380 describes a method of producing a dispersion-type rumen bypassing agent by solidifying a mixture containing hydrogenated (hardened) oil, lecithin, and saturated or unsaturated fatty acid monocarboxylates having 12 to 22 carbon atoms as protective agents into spheres having a diameter of 0.5 to 3 mm, by an air spraying method in which the mixture is sprayed into air at a liquefaction temperature of the protective agents, which is from 50 to 90° C. JP-A-2005-312380 also describes that a rumen bypassing agent containing 40.0% by weight of L-lysine monohydrochloride can be produced by means of the above production method. However, in the production method described in JP-A-2005-312380, it is necessary to use a mixture having low viscosity so as to allow the mixture to pass through the spray nozzles. However, if the content of L-lysine monohydrochloride in the mixture exceeds 40% by weight, the molten mixture will have high viscosity, and thus it will be difficult to make the mixture pass through the spray nozzles. Therefore, a preparation containing L-lysine monohydrochloride at a content which exceeds 40% by weight cannot be obtained by the above method. In fact, JP-A-2005-312380 does not describe a preparation containing L-lysine monohydrochloride at a content which exceeds 40% by weight. Furthermore, although the method described in JP-A-2005-312380 has a characteristic feature wherein small spherical granules having a diameter of 3 mm or less with relatively well established granularity can be obtained, there is a drawback. Because the granules are small particles, the granules are likely to escape through dry fodder and be sorted out when mixed with feedstuff.

JP-A-2006-141270 describes a process in which L-lysine monohydrochloride is coated with a coating composition including (A) hydrogenated oil, (B) lecithin and (C) a preservative, and thus yielding a dispersion-type rumen bypassing agent for ruminants containing (C) in an amount of 0.01 to 2.0% by weight. In Table 1 of JPA-2006-141270, particles containing 37.5% by weight of L-lysine monohydrochloride are described. However, the method described in JP-A-2006-141270 utilizes the air spraying method which sprays a mixture into air with an extruder as in the case of the method described in JP-A-2005-312380, and therefore, an L-lysine monohydrochloride preparation having a content exceeding 40% by weight cannot be obtained, as discussed with respect to the method described in JP-A-2005-312380. In addition, it is pointed out in Example 1 of JP-A-2006-141270 that a rumen bypassing agent solidified into spheres of 0.5 to 2.0 mm in size was obtained; and it is pointed out in paragraph [0005] of the specification, by citing from JP-A No. 2000-60440, "since the particle size is as large as 4 to 15 mm, the particles are prone to disintegrate by mastication . . . " That is, when the particle size is large, the agent is physically destroyed by cow's mastication, and the rumen bypass rate is decreased. With regard to coated-type preparations, it is pointed out that " . . . since this rumen bypassing agent is double-coated, there has been a drawback that when the coating at the core surface layer part is destroyed by rumination, mastication or the like, the protective effect is extremely reduced, or the like."

Meanwhile, JP-A-63-317053 describes a coated type feed additive for ruminants, wherein a core containing a biologically active substance consisting of L-lysine monohydrochloride and other excipients or binders is coated with at least one of fatty acid monocarboxylic acids including lecithin, glycerin fatty acid esters, hydrogenated oils, and beeswax/waxes. The content of L-lysine monohydrochloride in the core was 65% by weight, but when the coating layer which constitutes 20 to 30% by weight in the final preparation is also included, the content of L-lysine monohydrochloride in the preparation becomes 52 to 39% by weight.

JP-A-5-23114 also describes a coated type feed additive composition for ruminants, wherein cylindrical granules produced by extruding a mixture containing a biologically active substance such as L-lysine monohydrochloride through a screen. The granules are rendered to be spherically shaped and used as a core, and this core is coated with a composition including one of aliphatic monocarboxylic acids, hydrogenated oils, beeswax and waxes, and lecithin and an inorganic salt which is stable under neutral conditions and soluble in acidic conditions. It also describes a preparation containing L-lysine monohydrochloride in the core in an amount of 50% by weight.

The above-described coated type preparations are indeed advantageous in view of containing large amounts of biologically active ingredients, however, because their production includes first making a core containing a biologically active ingredient, and further coating this core with a coating agent, the production is achieved not in a continuous mode but in a batch mode, therefore, an increase in the number of production processes is unavoidable. Furthermore, in the invention described in JP-A-5-23114, when the biologically active substance is exposed at the surface by the grinding or damage due to mastication of lactating cows, the resistance to degradation in rumen juice is reduced. In order to avoid such reduction, the particle size is controlled to be several mm or less, or to 3 mm or less. However, such a particle size may present difficulty because the product may be sorted out when mixed with a feedstuff.

SUMMARY OF THE INVENTION

An object of the present invention is to provide a dispersion-type feed additive composition for ruminants containing a large amount of an acidic or neutral amino acid which is a biologically active substance, and a method of producing the same. For example, the feed additive composition may include granules which have rumen bypass properties, can release the biologically active substance at a high concentration in the small intestine of a ruminant animal to thereby promote the milk production of a lactating cow, and can be shaped into an arbitrary form that is unlikely to be classified when the composition is mixed with a feedstuff. A further object of the present invention is to provide a method of continuously producing the above-described granules at high efficiency.

As a result of intensive studies to solve the problems described above, the inventors of the present invention found that, granules that are arbitrarily shaped may be obtained in a highly productive manner when a feed composition containing a biologically active substance is heated to melt by extruding with a screw in a cylinder of an extrusion granulator (extruder), and the discharged molten mixture is allowed to fall into water from a certain height. Granules of a solidified mixture may thus be obtained. Exemplary embodiments of the present invention include:

(1) A feed additive composition for ruminants, comprising at least one protective agent selected from a hydrogenated vegetable oil and a hydrogenated animal oil having a melting point higher than 50° C. and lower than 90° C., lecithin, an acidic or neutral amino acid, and water.

(2) A method of producing a feed additive composition for ruminants, comprising a process of preparing a molten mixture formed from at least one protective agent selected from a hydrogenated vegetable oil and a hydrogenated animal oil having a melting point higher than 50° C. and lower than 90° C., lecithin, and an acidic or neutral amino acid, and a process of obtaining a solidified mixture by immersing said molten mixture into water.

(3) The method of producing a feed additive composition for ruminants according to (2) above, wherein said process of preparing a molten mixture comprises preparing a molten mixture through heating and melting using an extruder, and said process of obtaining a solidified mixture comprises obtaining a solidified mixture by allowing the molten mixture which is retained in a multi-hole shooter having a plurality of holes at the vessel bottom to fall through said plurality of holes to be immersed into water.

(4) The method of producing a feed additive composition for ruminants according to (2) or (3) above, further comprising a process of heat-treating the solidified mixture.

(5) A feed additive composition for ruminants, which is obtainable by a processes of preparing a molten mixture formed from at least one protective agent selected from a hydrogenated vegetable oil and a hydrogenated animal oil having a melting point higher than 50° C. and lower than 90° C., lecithin, and an acidic or neutral amino acid, and a process of obtaining a solidified mixture by immersing said molten mixture into water.

(6) The feed additive composition for ruminants according to (5) above, wherein said process of preparing a molten mixture comprises preparing a molten mixture through heating and melting using an extruder, and said process of obtaining a solidified mixture comprises obtaining a solidified mixture by allowing the molten mixture which is retained in a multi-hole shooter having a plurality of holes at the vessel bottom to fall through said plurality of holes to be immersed into water.

(7) The feed additive composition for ruminants according to (5) or (6), which is obtainable by further comprising a process of heat-treating the solidified mixture.

(8) A process for raising a ruminant, comprising feeding a ruminant a feed additive composition for ruminants according to (1).

(9) A process for making meat, comprising: feeding a ruminant a feed additive composition for ruminants according to (1); and harvesting meat from said ruminant.

(10) A process for making milk, comprising: feeding a ruminant a feed additive composition for ruminants according to (1); and harvesting milk from said ruminant.

(11) A process for making a dairy product, comprising: feeding a ruminant a feed additive composition for ruminants according to (1); harvesting milk from said ruminant; and converting said milk into said dairy product.

(12) A process for making wool, comprising: feeding a ruminant a feed additive composition for ruminants according to (1); and harvesting wool from said ruminant.

(13) A process for making leather, comprising: feeding a ruminant a feed additive composition for ruminants according to (1); harvesting skin from said ruminant; and converting said skin into said leather.

Embodiments of the feed additive composition for ruminants according to the present invention have a resistance to microorganisms in rumen juice, dissolve in the small intestine, and can carry high contents of an acidic or neutral amino acid efficiently to the small intestine of lactating cows. Therefore, the lactating cows can absorb large quantities of amino acids as nutrients, and the milk production can be enhanced. Furthermore, embodiments of the method of producing a feed additive composition for ruminants according to the present invention involve, for example, retaining a molten mixture produced with an extruder temporarily in a multi-hole shooter, and allowing this mixture to fall through a plurality of holes at the bottom of the multi-hole shooter into water. In embodiments of methods according to the present invention, it is possible to increase the production amount of the feed additive composition in accordance with the capacity of the extruder. Furthermore, by controlling the drop (fall distance) from the multi-hole shooter, the granules of the composition produced can be made into various shapes such as a spherical shape, a granular shape, a pellet shape or a shape of pressed barley, based on the energy with which the composition impacts the water surface. Granules of pellet shape and the shape of pressed barley are not easily sorted out when added to a feedstuff. Embodiments of the feed additive composition for ruminants according to the present invention include granules having a shape that is easily ground by the mastication of lactating cows, but remains stable in the rumen juice, irrespective of the shape. Further, because such feed additive compositions have a high content of amino acids which are biologically active substances, it is possible to obtain high quality granules that are capable of releasing more amino acids from the granules in the small intestine of lactating cows.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 1 is a graph showing the relationship between a lecithin content and elution rate of L-lysine monohydrochloride from an exemplary feed composition.

DETAILED DESCRIPTION OF THE PREFERRED EMBODIMENTS

Embodiments of feed additive compositions for ruminants according to the present invention contain at least one protective agent selected from a hydrogenated vegetable oil and a hydrogenated animal oil having a melting point higher than 50° C. and lower than 90° C., lecithin, water and an acidic or neutral amino acid.

The amino acid may include free acidic or neutral amino acids, as well as physiologically acceptable salts thereof. Suitable examples of the acidic amino acid include glutamic acid and salts thereof. Suitable examples of the neutral amino acid include isoleucine, methionine, glutamine, tryptophan, threonine, and salts thereof. In regard to the acidic or neutral amino acid, a commercially available product may be mixed with the other raw materials directly or after being pulverized. The pulverized crystals of the amino acid preferably have an average particle size of 100 μm or less, and more preferably 50 μm or less. The average particle size as used herein means the median diameter. Furthermore, embodiments of the feed additive composition for ruminants according to the present invention may also contain other amino acids, such as lysine, in addition to the acidic or neutral amino acid.

As for the at least one protective agent selected from a hydrogenated vegetable oil and a hydrogenated animal oil having a melting point higher than 50° C. and lower than 90° C., hydrogenated vegetable oils such as hydrogenated soybean oil, hydrogenated rapeseed oil, hydrogenated groundnut oil, hydrogenated olive oil, hydrogenated cottonseed oil, and hydrogenated palm oil, are preferably used. In addition to these, it is also possible to use beeswax, waxes and the like.

The content of lecithin in the feed additive composition is not particularly limited, but is preferably 1 to 2% by weight. It is considered that when lecithin, which is an amphoteric surfactant, is incorporated in a small amount, a complex of an amino acid (hydrophilic) and lecithin is formed, and when this complex is instantaneously cooled and solidified together with a hydrogenated oil (hydrophobic) in water, a granulation product having a very low elution rate of amino acid into water can be obtained.

In embodiments, the feed additive composition for ruminants according to the present invention is produced by a method including a process of preparing a molten mixture consisting of at least one protective agent selected from a hydrogenated vegetable oil and a hydrogenated animal oil having a melting point higher than 50° C. and lower than 90° C., lecithin and an acidic or neutral amino acid; and a process of obtaining a solidified mixture by immersing the molten mixture into water or an aqueous liquid. In the above method, a protective agent, lecithin and an acidic or neutral amino acid are used as raw materials, and these are melted and mixed. When this molten mixture is immersed into water to be formed into a granular shape, a portion of the acidic or neutral amino acid is eluted in water, but the amount is very small. Meanwhile, water is incorporated into the mixture at this stage. This water can be reduced by a subsequent drying process.

In embodiments of a process of preparing a molten mixture by a continuous production method according to the present invention, a commercially available extruder may be used, but it is preferable to remove the die plate which is placed at the outlet of the extruder. By removing the die plate, a molten mixture of the raw materials for the feed additive composition for ruminants can be obtained in a state in which the inside of the cylinder tube of the extruder is not subjected to extreme pressure. A molten mixture containing a large amount of an acidic or neutral amino acid is difficult to granulate by air spraying, but when such a molten mixture is allowed to fall freely directly from orifices having an appropriate diameter, the mixed molten product having a continuous rod shape is formed into a fine fiber form, and finally cut under the action of surface tension during falling to become separate and individual liquid droplets. When the liquid droplets are dropped into water which is in the state of being stirred, the liquid droplets are instantaneously cooled and solidified in the water. It is the production capacity of the extruder which determines the production amount of the feed additive composition. However, in production methods according to the present invention, it is possible to operate the extruder at its upper limit of capacity. Furthermore, exemplary methods according to the present invention need not employ an extruder, as long as the employed device is capable of preparing a molten mixture of the raw material composition, and preparing a molten mixture that is turned into liquid droplets upon falling from the device.

A multi-hole shooter may be employed to increase the amount of production in methods of producing the feed additive composition for ruminants according to the present invention. An exemplary multi-hole shooter according to the present invention includes a vessel having a perforated bottom with a plurality of holes, and is capable of temporarily storing a heated molten mixture discharged from the extruder. The multi-hole shooter preferably includes a heating capability so that the retained heated molten mixture is not cooled.

In such embodiments, the amount of the feed additive composition for ruminants that is produced is directly proportional to the number of holes provided at the bottom of the vessel. The distance from the bottom surface of the multi-hole shooter to the water surface (fall distance) determines the final shape of the granules. When the heated molten mixture is allowed to fall at a temperature of 65° C., granules having a spherical shape or a rugby ball-like shape are obtained at a drop (fall distance) of 5 cm to 15 cm. Furthermore, when the fall distance is further increased, the impact energy at the water surface is increased, and thus more flattened granules having a shape of pressed barley are obtained. At a fall distance of about 50 cm, granules having a shape of pressed barley with an undulating fringe are obtained. The diameter of the holes of the multi-hole shooter is selected depending on the viscosity and the size of the granules to be produced. In the case of producing small granules, it is preferable to have holes having a size of 0.5 to 3 mm. To obtain granules having a size with a diameter of about 10 mm, it is preferable to have holes having a size of about several millimeters. Typically, a size of 0.5 to 5 mm is preferred.

Exemplary processes employed in the method of the present invention will be described. The acidic or neutral amino acid which is used as the raw material may be pulverized prior to use. Pulverization is performed using, for example, a pulverizer, until the average of the particle size of the acidic or neutral amino acid becomes 100 μm or less and preferably 50 μm or less. If necessary, sieving may be performed. The order of addition of lecithin is not particularly limited. That is, in order to coat the surface of the acidic or neutral amino acid with lecithin, the two substances may be mixed in advance with use of a Nauta mixer. Alternatively, in order to improve the production efficiency, the protective agent, lecithin, and acidic or neutral amino acid may be nearly simultaneously charged into the cylinder of an extruder. It is also possible to charge predetermined amounts of the three components through a feed inlet provided near the inlet of the cylinder. Further, a molten mixture may be obtained by first charging a acidic or neutral amino acid and hydrogenated oil and mixing them at near room temperature, then finally charging lecithin, and heating the raw material composition to be melted. The temperature for melting and mixing the raw material composition may be at or above the melting point of the hydrogenated oil. For example, in the case of fully hydrogenated soybean oil, since the melting point is 67 to 71° C., a heating temperature for melting may be 80 to 85° C. A temperature higher than the melting point by 5 to 15° C. may be sufficient. The heating temperature should not be a temperature above the melting point from the beginning. That is, the raw materials are initially pre-heated to a temperature lower than the melting point by 5 to 10° C., conveyed by the screw in the cylinder of the extruder, and then heated to a predetermined temperature above the melting point. By heating in this manner, a stable molten mixture can be obtained efficiently. The discharged heated molten mixture may be temporarily retained in a multi-hole shooter, and then allowed to fall freely into water from the holes having a size of 1 to 4 mm provided at the bottom. The temperature of water into which the falling objects are immersed may be about 10 to 30° C. The molten mixture dropped from the multi-hole shooter may fall into water which is being stirred in a water tank configured to cool granules, and become instantaneously solidified there. Water may constantly be replenished while the water temperature is maintained constant. At the same time, the solidified mixture may be discharged from a water tank configured to cool granules along with overflowing water. In embodiments, the solidified mixture has a specific gravity of about 1.1, and drifts in the water. The granules of the solidified mixture discharged from the water tank may be collected with a net or a netted vessel, and dried to yield a feed additive composition for ruminants.

In another embodiment, present invention provides novel processes for raising a ruminant by feeding the ruminant such a feed additive composition. Such ruminants include cattle, goats, sheep, giraffes, American Bison, European Bison, yaks, water buffalo, deer, camels, alpacas, llamas, wildebeest, antelope, pronghorn, and nilgai. These ruminants may be fed the feed additive composition of the present invention at any time and in any amount during their life. That is, the ruminant may be fed the feed additive composition of the present invention either by itself or as part of a diet which includes other feedstuffs. Moreover, the ruminant may be fed the feed additive composition of the present invention at any time during their lifetime. The ruminant may be fed the feed additive composition of the present invention continuously, at regular intervals, or intermittently. The ruminant may be fed the feed additive composition of the present invention in an amount such that it accounts for all, a majority, or a minority of the feed in the ruminant's diet for any portion of time in the animal's life. Preferably, the ruminant is fed the feed additive composition of the present invention in an amount such that it accounts for a majority of the feed in the animal's diet for a significant portion of the animal's lifetime.

In another embodiment, the present invention provides novel processes for making meat by harvesting meat from a ruminant which have been fed such a feed additive composition. The ruminants in this embodiment are the same as those described above in connection with the present process for raising ruminants. The feeding may be carried out as described above in connection with the process for raising ruminants.

The meat may be harvesting at any suitable time during the animal's lifetime. The harvesting of the meat may be carried out using the techniques conventional in the art of butchering. Typical meats to be harvested include, beef, pork, mutton, lamb, venison, bison, etc. The meat may be sold fresh or frozen. The meat may be processed as described in Kirk-Othmer, *Encyclopedia of Chemical Technology*, Fourth Ed., Wiley-Interscience, NY, vol. 16, pp. 68-87, 1995, which is incorporated herein by reference.

In another embodiment, the present invention provides novel processes for making milk by harvesting milk from a ruminant which have been fed such a feed additive composition. The ruminants in this embodiment are those which produce milk, such as cattle, oxen, bison, deer, goats, sheep, etc. The feeding may be carried out as described above in connection with the process for raising ruminants. The harvesting of the milk may be carried out using the conventional techniques known to those in the art. The milk may be processed, stored, cooled, shipped, and packaged, as described in Kirk-Othmer, *Encyclopedia of Chemical Technology*, Fourth Ed., Wiley-Interscience, NY, vol. 16, pp. 700-746, 1995, which is incorporated herein by reference.

In another embodiment, the present invention provides processes for making a dairy product from the milk harvested from a ruminant which has been fed the feed additive composition of the present invention. Such dairy products include evaporated and condensed milk, dry milk, cream, anhydrous milk fat, butter, buttermilk, cheese, yogurt, and frozen desserts (such as ice cream, frozen yogurt, ice milk, sherbets, and mellorine), lactose, and casein. The conversion of the milk into the dairy product may be carried out using conventional techniques known to those skilled in the art as described in Kirk-Othmer, *Encyclopedia of Chemical Technology*, Fourth Ed., Wiley-Interscience, NY, vol. 16, pp. 700-746, 1995, which is incorporated herein by reference.

In another embodiment, the present invention provides novel processes for making wool by harvesting wool from a ruminant been fed such a feed additive composition. The ruminants in this embodiment are those which produce wool, such as goats, sheep, lambs, lama, alpaca, etc. The feeding may be carried out as described above in connection with the process for raising ruminants. The wool may be harvested and treated by conventional techniques known to those skill in the art and as described in Kirk-Othmer, *Encyclopedia of Chemical Technology*, Fourth Ed., Wiley-Interscience, NY, vol. 25, pp. 664-712, 1998, which is incorporated herein by reference.

In another embodiment, the present invention provides novel processes for making leather by harvesting skin from a ruminant which have been fed such a feed additive composition and converting the skin into leather. In the context of the present invention, the term leather also includes suede and the term skin include hides and pelts. The ruminants in this embodiment are those whose skin may be converted into leather, such as cattle, oxen, bison, deer, goats, sheep, lambs, lama, alpaca, yaks, etc. The feeding may be carried out as described above in connection with the process for raising ruminants. The skin may be harvested and converted into leather by conventional techniques known to those skill in the art and as described in Kirk-Othmer, *Encyclopedia of Chemical Technology*, Fourth Ed., Wiley-Interscience, NY, vol. 15, pp. 159-177, 1995, which is incorporated herein by reference.

Other features of the invention will become apparent in the course of the following descriptions of exemplary embodiments which are given for illustration of the invention and are not intended to be limiting thereof.

EXAMPLES

<Method for Measuring Viscosity>

A molten mixture in a slurry form obtained by heating (at 85° C.) and melting the mixture using an extruder was weighed to 100 g in a 200-ml beaker made of heat resistant glass, placed in a constant temperature water bath at 90° C., and slowly stirred to set the temperature of the molten mixture at 90° C. When the temperature became constant at 90° C., viscosity at 90° C. was measured using a rotational viscometer (trade name: VISCOMETER MODEL BL, manufactured by TOKIMEC, INC.). For the measurement, a rotating shaft for direct viscosity measurement was immersed into the molten mixture in the beaker, the rotating shaft was rotated, and the viscosity was measured several times. When the value became constant, the value was determined as the rotational viscosity (Pa·s) at 90° C.

<Content of Amino Acid in Preparation>

In a 50-ml conical tube manufactured by FALCON, Corp., 4.00 g of the preparation and 20.0 g of pure water were weighed and tightly closed with a stopper cap. The conical tube was immersed in a constant temperature water bath at 85° C. for 20 minutes, to melt the hydrogenated soybean oil. The hydrogenated oil and the amino acid were separated, and the amino acid was dissolved in an aqueous solution. The amino acid thus recovered was analyzed by conventional liquid chromatography, and thus the content (% by weight) of the amino acid in the preparation was determined.

<Elution Rate of Amino Acid>

2.00 g of the preparation was weighed in a 50-ml conical tube manufactured by FALCON, Corp., and 10.0 g of pure water was added thereto. The conical tube was tightly closed with a stopper cap and laid horizontal, and the tube was shaken for 10 minutes in an oscillating shaker at 40° C. Subsequently, the amino acid in the aqueous solution was analyzed before and after the shaking, and the proportion (%) of the amino acid in the preparation which was eluted out at 40° C. for 10 minutes, was designated as the elution rate (%).

<Protection Rate>

2.00 g of the preparation was weighed in a 50-ml conical tube manufactured by FALCON, Corp., and 10.0 g of pure water was added thereto. The conical tube was tightly closed with a stopper cap and laid horizontal, and the tube was shaken for 20 hours in an oscillating shaker at 40° C. Subsequently, the amino acid in the aqueous solution was analyzed before and after the shaking, and the proportion (%) of the amino acid in the preparation which was not eluted out at 40° C. for 20 hours, was determined as the protection rate (%).

Example 1

In a 1 liter vessel made of stainless steel, 410 g of fully hydrogenated soybean oil (melting point 67° C.; manufactured by Yokozeki Oil & Fat Industries Co., Ltd.) and 10.0 g of soybean lecithin (manufactured by Ajinomoto Co., Inc.) were weighed, and the mixture was heated to 85° C. while mixed on a plate heater. Thus, a solution at 85° C. formed by fusing fully hydrogenated soybean oil and soybean lecithin was prepared. Subsequently, the amino acids for medical use indicated in Table 1, which had been pulverized, were each continuously introduced into the solution (85° C.), in small portions in a heated state (85° C.) while the mixture was sufficiently mixed. When the limit at which the molten slurry of amino acid can form liquid droplets (rotational viscosity of slurry 5 Pa·s/85° C.) was reached, the introduction of the amino acid was stopped. Subsequently, this molten slurry of amino acid was placed in a multi-hole shooter (number of holes: 30, diameter of hole: 2 mm), and the liquid droplets which had turned into liquid droplets and were falling from the bottom face of the shooter, were introduced into a water tank (temperature: 10° C., distance from the bottom of the shooter to the water surface: 10 cm), which was placed immediately below the shooter and was being agitated, so that the liquid droplets would be cooled. Thereby, a granulation product which had been instantaneously solidified was obtained. This granulation product was recovered, dehydrated and dried (air dried). Thus, granulation products of the amino acids indicated in Table 1 were obtained. Here, there were almost no raw materials left in the compositions obtained, and there were almost no other losses. The recovery ratio was as high as 98% or more in all cases. As such, granulation products (particle size: 2.0 to 5.6 mm) having high contents of the respective amino acids were obtained.

The content of amino acid can be adjusted to 40% by weight or more, except for tryptophan, and the elution rate of amino acid into water for the invented granulation products was very low, while the protection ratio for amino acid after elution for 20 hours was also high.

TABLE 1

| Invention | Amino acid | Raw material composition (% by weight) | | | Elution rate of amino acid %/min | Protection rate (20 h) (%) |
| --- | --- | --- | --- | --- | --- | --- |
| | | Amino acid (% by weight) | Fully hydrogenated soybean oil (% by weight) | Soybean lecithin (% by weight) | | |
| 1 | Isoleucine | 40 | 59 | 1.0 | 0.04 | 87.1 |
| 2 | Methionine | 46 | 53 | 1.0 | 0.05 | 87.5 |
| 3 | Methionine | 52 | 47 | 1.0 | 0.04 | 83.3 |
| 4 | Glutamine | 64 | 35 | 1.0 | 0.01 | 95.4 |
| 5 | Glutamic acid | 66 | 33 | 1.0 | 0.02 | 91.7 |
| 6 | MSG* | 63 | 36 | 1.0 | 0.07 | 78.6 |
| 7 | Tryptophan | 36 | 62 | 2.0 | 0.02 | 94.1 |
| 8 | Threonine | 59 | 40 | 1.0 | 0.12 | 65.6 |

*MSG: Mono sodium glutamate

Comparative Example 1

100 g of a mixture obtained by adding soybean lecithin and fully hydrogenated soybean oil to each of the amino acids indicated for the inventions of Example 1, was placed in the container for a speed blender, and the mixture was finely pulverized at a speed of rotation of 15,700 rpm for 5 minutes at normal temperature, while the material temperature of the mixture of soybean lecithin and fully hydrogenated soybean oil was kept from exceeding 55° C. Thus, a composition having each amino acid, soybean lecithin and fully hydrogenated soybean oil uniformly mixed therein, was prepared.

As indicated in Table 2, the preparations of various amino acids obtained by such a method had very high rates of elution of amino acid into water.

Comparative Example 2

When the contents of the respective amino acids indicated for the inventions of Example 1 were respectively further increased, the viscosity drastically increased, exceeding the level which is capable of forming liquid droplets (rotational viscosity 5 Pa·s/85° C.), and the preparations turned into paste forms. Accordingly, dispersion of the molten slurry could not be achieved. As a result, granulation products having high amino acid protection ratios, which are obtainable by instantaneously solidifying the molten slurry in water, could not be obtained.

Test Example 100 g of three components including finely pulverized L-lysine monohydrochloride for feed (manufactured by Ajinomoto Co., Inc.) having an average particle size of 75 μm soybean lecithin (manufactured by Ajinomoto Co., Inc.), and fully hydrogenated soybean oil (melting point: 67° C., manufactured by Yokozeki Oil & Fat Corp.) was weighed in a beaker at the ratio of percentage by weight shown in Table 3, and the mixture was heated to 80° C. while sufficiently mixing to obtain a molten slurry of L-lysine monohydrochloride. Then, under the conditions described in Example 1, dispersion of the molten slurry by means of a multi-hole shooter, conversion into liquid droplets, and solidification by cooling in water were carried out to prepare feed additive compositions for ruminants 1 to 7 and a comparison com-

TABLE 2

| Invention | Amino acid | Raw material composition (% by weight) | | | Elution rate of amino acid %/min | Ratio of elution rate of amino acid (20 h) (%) |
| --- | --- | --- | --- | --- | --- | --- |
| | | Amino acid (% by weight) | Fully hydrogenated soybean oil (% by weight) | Soybean lecithin (% by weight) | | |
| 1 | Isoleucine | 40 | 59 | 1.0 | 2.8 | 1/70 |
| 2 | Methionine | 46 | 53 | 1.0 | 3.0 | 1/60 |
| 3 | Methionine | 52 | 47 | 1.0 | 3.1 | 1/78 |
| 4 | Glutamine | 64 | 35 | 1.0 | 3.1 | 1/310 |
| 5 | Glutamic acid | 66 | 33 | 1.0 | 1.0 | 1/50 |
| 6 | MSG* | 63 | 36 | 1.0 | 7.7 | 1/110 |
| 7 | Tryptophan | 36 | 62 | 2.0 | 0.9 | 1/45 |
| 8 | Threonine | 59 | 40 | 1.0 | 4.4 | 1/37 |

*Mono sodium glutamate position 8. In addition, since the heated molten product of the comparison composition 8 was highly viscous so that liquid droplets from the multi-hole shooter were not formed, a granulated composition was prepared by collecting the heated molten product in small amounts with a microspatula and immediately immersing them into water to solidify.

2.00 g of each of the compositions was weighed in a 50-ml conical tube manufactured by FALCON, Corp., and 10.0 g of an artificial rumen juice was added thereto. The tube was tightly closed with a stopper cap and laid horizontally, and the tube was shaken in an oscillating shaker at 40° C. for 20 hours. The contents of L-lysine monohydrochloride in the aqueous solution before and after the shaking were analyzed, and thus the elution rate of L-lysine monohydrochloride per unit time was calculated.

The results are presented in Table 3 and FIG. 1.

TABLE 3

| | Raw material composition (% by weight) | | | | |
|---|---|---|---|---|---|
| Test No. | Lecithin | L-lysine monohydrochloride | Fully hydrogenated soybean oil | Elution rate of lysine %/h | Ratio of elution rate of lysine |
| 1 | 0.05 | 54 | 45.95 | 8.5 | 1/1.5 |
| 2 | 0.1 | 54 | 45.9 | 4.1 | 1/3.2 |
| 3 | 1 | 54 | 45 | 2.2 | 1/6.0 |
| 4 | 2 | 54 | 44 | 2.3 | 1/5.7 |
| 5 | 4 | 54 | 42 | 5.9 | 1/2.2 |
| 6 | 5 | 54 | 41 | 11.9 | 1/1.1 |
| 7 | 6 | 54 | 40 | 30.1 | 2.3 |
| 8 | 0 | 54 | 46 | 13.1 | 1 |

As shown in Table 3 and FIG. 1, it was confirmed that elution of L-lysine monohydrochloride from the composition in the rumen juice can be suppressed by the addition of lecithin. The effect of suppressing the elution of L-lysine monohydrochloride was noticeable with an additional amount of lecithin of about 5% by weight or less, and particularly 1 to 5% by weight. In addition, when lecithin is contained in the raw materials in an amount of 6% by weight or more, the elution rate of lysine can also be increased in comparison to the composition having no lecithin added.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method of producing a feed additive composition, comprising:
   preparing a molten mixture of at least one protective agent, lecithin, and an acidic or neutral amino acid; and
   immersing the molten mixture in water or an aqueous liquid to obtain a solidified mixture;

wherein:
   the at least one protective agent comprises at least one member selected from the group consisting of a hydrogenated vegetable oil having a melting point of higher than 50° C. and lower than 90° C. and a hydrogenated animal oil having a melting point higher than 50° C. and lower than 90° C.; and
   the acidic or neutral amino acid is glutamic acid or glutamine.

2. The method according to claim 1, wherein:
   preparing the molten mixture comprises preparing the molten mixture by heating and melting with an extruder; and
   immersing the molten mixture comprises placing the molten mixture in a multi-hole shooter comprising a vessel bottom including a plurality of holes, and allowing the molten mixture to fall through the plurality of holes into water or the aqueous liquid.

3. The method according to claim 2, wherein a distance from the vessel bottom to the surface of the water or the aqueous liquid is from 5 to 50 cm.

4. The method according to claim 1, further comprising heat-treating the solidified mixture.

5. The method according to claim 1, wherein the at least one protective agent comprises at least one member selected from the group consisting of hydrogenated soybean oil, hydrogenated rapeseed oil, hydrogenated groundnut oil, hydrogenated olive oil, hydrogenated cottonseed oil, and hydrogenated palm oil.

6. The method according to claim 1, wherein the acidic or neutral amino acid has an average particle size of 100 μm or less.

7. The method according to claim 1, wherein preparing the molten mixture comprises adding lecithin in an amount such that lecithin is present in the feed additive composition in an amount of from 1 to 2% by weight.

8. The method according to claim 1, wherein:
   immersing the molten mixture in water comprises immersing in water in a tank that is being stirred and maintained at a constant temperature; and
   the method further comprises discharging the solidified mixture from the tank with overflowing water.

* * * * *